(12) United States Patent
Ham et al.

(10) Patent No.: US 9,700,197 B2
(45) Date of Patent: Jul. 11, 2017

(54) DISHWASHER AND METHOD OF CONTROLLING THE SAME

(71) Applicant: SAMSUNG ELECTRONICS CO., LTD., Suwon-si, Gyeonggi-do (KR)

(72) Inventors: Hyung Kwen Ham, Suwon-si (KR); Jung Yoon Hahm, Yongin-si (KR); Dong Ho Park, Suwon-si (KR); Keon Ho Hong, Suwon-si (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 280 days.

(21) Appl. No.: 14/175,130

(22) Filed: Feb. 7, 2014

(65) Prior Publication Data

US 2014/0224285 A1 Aug. 14, 2014

(30) Foreign Application Priority Data

Feb. 8, 2013 (KR) .................. 10-2013-0014251

(51) Int. Cl.
*A47L 15/00* (2006.01)
*A47L 15/42* (2006.01)

(52) U.S. Cl.
CPC ....... *A47L 15/4225* (2013.01); *A47L 15/0047* (2013.01); *A47L 15/4219* (2013.01); *A47L 15/4291* (2013.01); *Y02B 40/44* (2013.01); *Y10T 137/0318* (2015.04); *Y10T 137/86067* (2015.04)

(58) Field of Classification Search
CPC ............. A47L 15/0047; A47L 15/4219; A47L 15/4225; A47L 15/4291; Y02B 40/46; Y10T 137/0318; Y10T 137/86067

USPC .......................... 134/56 D, 57 D, 58 D, 184
See application file for complete search history.

(56) References Cited

U.S. PATENT DOCUMENTS

| | | | |
|---|---|---|---|
| 2005/0241675 A1* | 11/2005 | Jung ................... | A47L 15/4244 134/18 |
| 2011/0114140 A1* | 5/2011 | Heisele ............... | A47L 15/0015 134/56 D |
| 2012/0145195 A1 | 6/2012 | Buser et al. | |

FOREIGN PATENT DOCUMENTS

KR 10-2011-0107517 10/2011

* cited by examiner

*Primary Examiner* — Michael Barr
*Assistant Examiner* — Levon J Shahinian
(74) *Attorney, Agent, or Firm* — Staas & Halsey LLP

(57) ABSTRACT

A dishwasher enabling wash water to be reused, and a method of controlling the same, include a body provided with a washing tub on which dishware is disposed to be washed, a sump unit provided at a lower side of the body, and configured to accommodate wash water and pump the accommodated wash water, a spray nozzle configured to receive the wash water from the sump unit and spray the wash water to the washing tub, a storage tank provided at a lower side of the body and configured to accommodate used wash water which is supplied from the sump unit, a water supply pipe connecting the sump unit to the storage tank, and a pump connected to the water supply pipe and configured to pump the wash water being accommodated in the sump unit to the storage tank.

16 Claims, 8 Drawing Sheets

DISHWASHER AND METHOD OF CONTROLLING THE SAME

CROSS-REFERENCE TO RELATED APPLICATIONS

This application claims the benefit of Korean Patent Application No. 10-2013-0014251, filed on Feb. 8, 2013, in the Korean Intellectual Property Office, the disclosure of which is incorporated herein by reference.

BACKGROUND

1. Field

One or more embodiments relate to a dishwasher enabling wash water to be reused, and a method of controlling the same.

2. Description of the Related Art

In general, a dishwasher includes a main body provided with a washing tub, a dishware basket provided at an inside the washing tub, a spray nozzle to spray wash water toward the dishware basket, and a sump unit connected to the spray nozzle to pump wash water to the spray nozzle.

The sump unit included in the dishwasher includes an impeller, a flow passage connected to the impeller to guide wash water toward the spray nozzle, a dirt chamber to collect dirt mixed in the wash water while being connected a passage, a drain pump connected to the dirt chamber, and a filter cover configured to cover the dirt chamber and provided with a filter to separate and filter dirt from the wash water admitted into the dirt chamber.

The dishwasher may perform a preliminary washing stage, a main washing stage, a rinsing stage, and a drying stage. In the preliminary washing stage, dirt of dishware is removed by spraying wash water without detergent, and in the main washing stage, wash water together with detergent is supplied to wash the dishware. In the rinsing stage, wash water is supplied to rinse the dishware, and in the drying stage, heated air is supplied to the inside the washing tub to dry the dishware.

According to the conventional dishwasher, a storage tank is provided at a lateral side of a body to store used water. All or some of the wash water being sprayed to the inside of the washing tub is supplied to the storage tank by a pump provided at the sump unit.

SUMMARY

The foregoing described problems may be overcome and/or other aspects may be achieved by one or more embodiments of a dishwasher and a method of controlling the same, capable of storing and reusing wash water having a low contamination, and capable of storing a sufficient amount of used wash water in a storage tank by use of a pump that is additionally provided.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a dishwasher may include a body, a sump unit, a spray nozzle, a storage tank, a water supply pipe and a second pump. The body may be provided with a washing tub in which dishware may be disposed to be washed. The sump unit may be provided at a lower side of the body to accommodate wash water, and may include a first pump configured to pump the accommodated wash water. The spray nozzle may be configured to receive the wash water from the sump unit and spray the wash water to the washing tub. The storage tank may be provided at a lower side of the body and may be configured to accommodate used wash water which may be supplied from the sump unit. The water supply pipe may connect the sump unit to the storage tank. The second pump may be connected to the water supply pipe and may be configured to pump the wash water that may be accommodated in the storage tank to the sump unit such that the wash water may be reused.

A height of a bottom surface of the storage tank may be set to be lower than a height of a bottom surface of the sump unit.

The water supply pipe may be further provided with a valve to open and close the water supply pipe.

The storage tank may be provided with a sensor to sense a water level of the wash water in the storage tank.

If the wash water of the storage tank is sensed by the sensor, the valve may be closed.

A drain pipe may be connected to the sump unit, and if the valve is closed, the wash water remaining in the sump unit may be drained through the drain pipe.

In accordance with or more embodiments, a method of controlling a dishwasher that may have a storage tank, which may be provided at a lower side of a body to receive used wash water from a sump unit and accommodate the received used wash water, and a pump, which may be configured to pump the wash water accommodated in the storage tank to the sump unit may include: determining whether a rinsing process is completed; stopping an operation of a washing pump; supplying the wash water accommodated in the sump unit to the storage tank by opening a valve; determining whether a water level of the wash water in the storage tank reaches a predetermined water level; and closing the valve.

In accordance with or more embodiments, a dishwasher may include a body, a sump unit, a spray nozzle, a storage tank, a water supply pipe, and a pump. The body may be provided with a washing tub in which dishware may be disposed to be washed. The sump unit may be provided at a lower side of the body, and may be configured to accommodate wash water and pump the accommodated wash water. The spray nozzle may be configured to receive the wash water from the sump unit and spray the wash water to the washing tub. The storage tank may be provided at a lateral side of the body and may be configured to accommodate used wash water which may be supplied from the sump unit. The water supply pipe may connect the sump unit to the storage tank. The pump may be connected to the water supply pipe and may be configured to pump the wash water that may be accommodated in the sump unit to the storage tank.

The storage tank may be provided with a sensor to sense a water level of the wash water in the storage tank.

The dishwasher may further include a drain pipe connected to the sump unit.

If the wash water in the storage tank is sensed by the sensor, the wash water remaining in the sump unit may be drained through the drain pipe.

The water supply pipe may be provided with a valve and a controller may allow the wash water that may be accommodated in the storage tank to move toward the sump unit by opening the valve.

The dishwasher may further include a spray nozzle configured to receive the wash water from the sump unit and spray the wash water to the inside of the washing tub.

The sump unit may be further provided with a washing pump, and the wash water that may be accommodated in the sump unit may be pumped to the spray nozzle by the washing pump.

The pump may be an impeller pump.

The pump may be located at a lower side of the washing pump provided at the sump unit.

The storage tank may be formed, for example, of metal or plastic, etc.

The dishwasher may further include an air brake having one side communicating with the washing tub and other side communicating with the storage tank.

The wash water in the storage tank may be introduced to the washing tub through the air brake such that the storage tank may be kept in a predetermined water level, and the wash water introduced to the washing tub may be introduced to the sump unit.

In accordance with or more embodiments, a method of controlling a dishwasher having a storage tank, which may be provided at a lateral side of a body and may be configured to receive used wash water from a sump unit and store the received used wash water, and a pump, which may be configured to pump the wash water that may be accommodated in the storage tank toward the sump unit may include: determining whether a rinsing process is completed; stopping an operation of a washing pump; supplying the wash water accommodated in the sump unit to the storage tank by operating a pump; determining whether a water level of the wash water in the storage tank reaches a predetermined water level; and stopping an operation of the pump.

As described above, the water consumption required for washing dishware may be reduced by reusing the wash water, and a sufficient amount of used wash water may be stored in the storage tank since a pump is additionally provided to pump the wash water to the storage tank.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
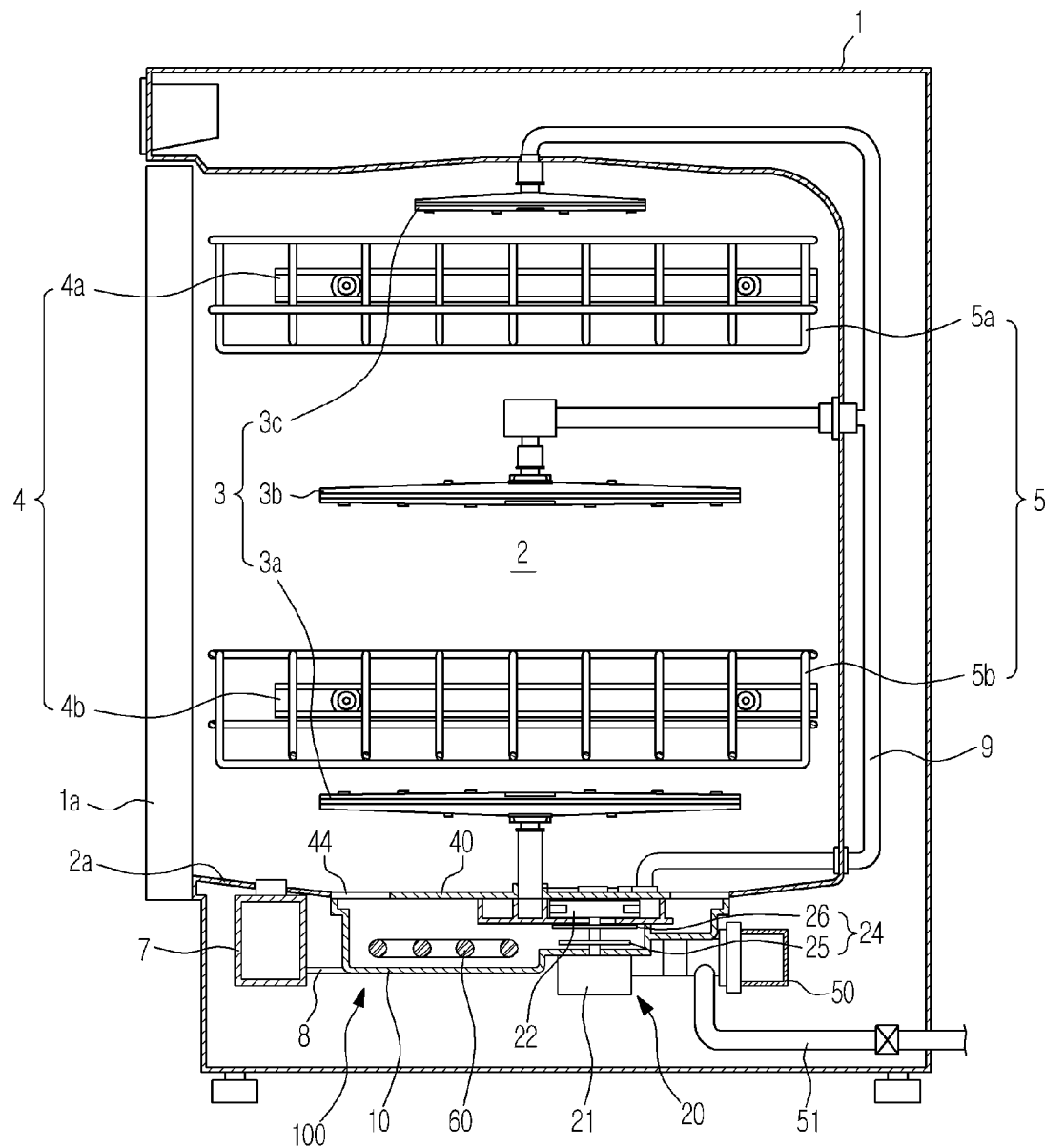
FIG. 1 is a side cross sectional view illustrating a dishwasher in accordance with one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 is a side cross sectional view illustrating a dishwasher in accordance with one or more embodiments.

Referring to FIG. 1, a dishwasher in accordance with one or more embodiments may include a body 1 and a door 1a. The body 1 may include a washing tub 2 in which dishware may be disposed to be washed. The body 1 may be provided with an opening at one side surface thereof, and the door 1a may be rotatably coupled to the one side surface of the body 1 to open and close the one side surface.

A sump unit 100 may be provided at a lower side of the washing tub 2. The sump unit 100 may accommodate wash water and may pump the accommodated wash water. The wash water pumped by the sump unit 100 may be sprayed to the inside of the washing tub 2 through a spray nozzle 3.

A rack 4 may be provided on the washing tub 2. The rack 4 may include an upper rack 4a that may be disposed at an upper portion of the washing tub 2 and a lower rack 4b that may be disposed at a lower portion of the washing tub 2. A dishware basket 5 on which dishware may be located may be slidably mounted on the rack 4. The dishware basket 5 may include a first dishware basket 5a which may be mounted on the upper rack 4a and a second dishware basket 5b which may be mounted on the lower rack 4b.

A water supply port (not shown) may be provided at one side surface of the washing tub 2, and the wash water supplied through the water supply port (not shown) may fall to a bottom surface 2a of the washing tub 2. The wash water that may fall to the bottom surface 2a of the washing tub 2 may be introduced to the inside of the sump unit 100 through an inlet port 44, which may be formed at a housing cover 40 of the sump unit 100.

The sump unit 100 may accommodate wash water, and may supply the wash water to the spray nozzle 3 by pumping the wash water. The sump unit 100 may include a sump housing 10 and a washing pump 20. The sump housing 10 may form the external appearance of the sump unit 100. The washing pump 20 may be mounted at one side of the sump housing 10.

A heater 60 may be mounted at the sump housing 10. For example, the washing pump 20 may be mounted at a side away from a center portion of the sump housing 10 in one radial direction, and the heater 60 to heat the wash water may be mounted at a position opposite to the washing pump 20 with respect to the center portion. The sump housing 10 may be provided with a heater installation groove (not shown) formed in a depressed manner, and the heater 60 may be accommodated in the heater installation groove (not shown).

The washing pump 20 may include a pump motor 21 and an impeller 22. The pump motor 21 may be fixedly installed on a lower surface of the sump housing 10. The pump motor 21 may be installed at the lower surface of the sump housing 10 such that a rotating shaft of the pump motor 21 may protrude while passing through the lower surface of the sump housing 10. In this case, a sealing member (not shown) may be provided at the lower surface of the sump housing 10 while surrounding the rotating shaft, to possibly prevent wash water from leaking toward the pump motor 21. The impeller 22 may be rotatably mounted at the rotating shaft of the pump motor 21. The impeller 22 may discharge the wash water, which may be introduced in an axial direction, in a radial direction.

A crushing device 24 may be provided between the pump motor 21 and the impeller 22 to crush dirt. The crush device 24 may be configured to crush dirt, such as food waste, into small lumps. The crushing device 24 may include a cutter part 25, which may be rotatably coupled to the rotating shaft of the pump motor 21, and a dirt filter 26 that may be provided at an upper side of the cutter part 25 to possibly prevent a large lump of dirt from being introduced to the impeller 22. The sump unit 100 may be provided with a dirt chamber (not shown), and fine dirt passing through the dirt filter 26 may be collected by the dirt chamber (not shown).

A drain pump 50 and a drain pipe 51 may be connected to the dirt chamber (not shown). As the drain pump 50 operates, the dirt that may be collected at the dirt chamber (not shown) may be discharged toward the drain pipe 51 together with wash water according to the operation of the drain pump 50.

The spray nozzle 3 may be provided so as to be rotated by a spray pressure of the sprayed wash water. The spray nozzle 3 may include a first spray nozzle 3a that may be disposed between the sump unit 100 and the lower rack 4b, a second spray nozzle 3b that may be disposed between the upper rack 4a and the lower rack 4b, and a third spray nozzle 3c that may be disposed at the upper side of the upper rack 4a.

The first spray nozzle 3a may be rotatably connected to an upper center portion of the sump unit 100. The first spray nozzle 3a may spray the wash water, which may be pumped from the sump unit 100, toward the second dishware basket 5b which may be adjacent to the first spray nozzle 3a. The second spray nozzle 3b and the third spray nozzle 3c may spray the wash water, which may be pumped from the sump unit 100, toward the first dishware basket 5a and the second dishware basket 5b, which may be adjacent to the second spray nozzle 3b and the third spray nozzle 3c, respectively.

The second spray nozzle 3b and the third spray nozzle 3c may be connected to the sump unit 100 through an extension passage 9. The extension passage 9 may extend along a rear surface of the washing tub 2. The wash water pumped by the sump unit 100 may be supplied to the second spray nozzle 3b and the third spray nozzle 3c through the extension passage 9.

Figure 2:
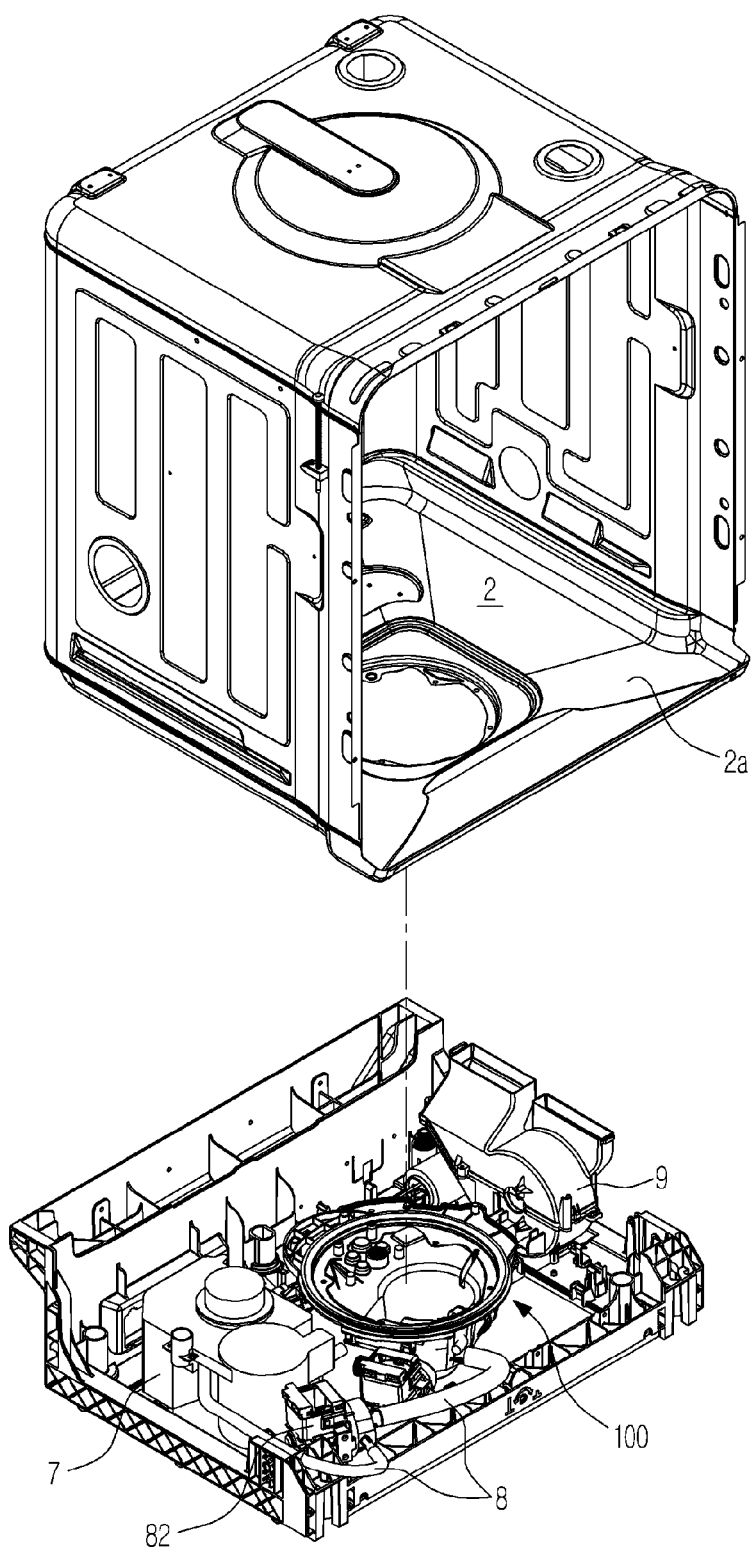
FIG. 2 is a dissembled view of a body of a dishwasher in accordance with one or more embodiments.
Figure 3:
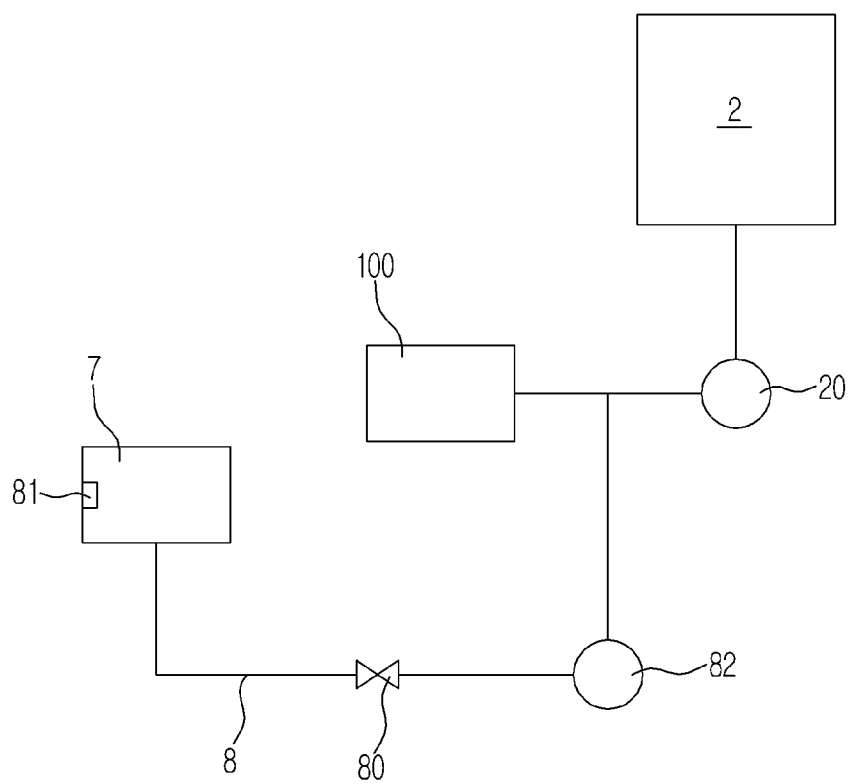
FIG. 3 is a drawing illustrating the configuration of a dishwasher in accordance with one or more embodiments.

FIG. 2 is a dissembled view of a body of a dishwasher in accordance with one or more embodiments. FIG. 3 is a drawing illustrating the configuration of a dishwasher in accordance with one or more embodiments.

Referring to FIGS. 2 and 3, a storage tank 7 may be provided at a lower side of the body 1 of a dishwasher in accordance with one or more embodiments, to store wash water that may be reused. The storage tank 7 may be connected to the sump unit 100. The storage tank 7 may be formed, for example, of metal or plastic, etc.

In detail, the sump unit 100 may be connected to the storage tank 7 through a water supply pipe 8. The wash water that may be accommodated in the sump unit 100 may be introduced to the storage tank 7 through the water supply pipe 8. In detail, the wash water having been used during a rinsing of the dishware may be filtered by the sump unit 100, and then may be introduced to the storage tank 7 through the water supply pipe 8. Since the storage tank 7 may be provided at a lower side of the body 1, the storage tank 7 may have an increased capacity when compared to a case of a storage tank 7 provided at a lateral side of the body 1. Accordingly, the storage tank 7 may be able to store a larger amount of wash water.

A valve 80 may be provided on the water supply pipe 8 to open and close the water supply pipe 8. The valve 80 may be, for example, an actuator or a solenoid valve, etc. After the dishwasher performs a rinsing process, the valve 80 may be open so that the wash water that may be accommodated in the sump unit 100 may be introduced to the storage tank 7 through the water supply pipe 8. In detail, after the dishwasher performs a rinsing process, the valve 80 may be open in a state when the operation of the washing pump 20 stops and the drain pump 50 does not operate. As the valve 80 is open, the wash water that may be accommodated in the sump unit 100 may be introduced to the storage tank 7.

At this time, with respect to a floor on which the dishwasher is installed, the height of the bottom surface of the storage tank 7 may be provided to be lower than the height of the bottom surface of the sump unit 100. In this case, due to the difference in height between the sump unit 100 and the storage tank 7, the wash water that may be stored in the sump unit 100 may be introduced to the storage tank 7. Accordingly, the used wash water may be stored in the storage tank 7.

The wash water stored in the sump unit 100 may be moved to the storage tank 7 by being pumped by a pump 82 that may be additionally provided between the sump unit 100 and the storage tank 7. Since the wash waster of the sump unit 100 may be pumped by the pump 82 to the storage tank 7, the time for the wash water to move may be reduced. The pump 82 may be an impeller pump, for example. In a case in which the pump 82 is an impeller pump, the pump 92 may be provided at an upper side of the washing pump 20. Accordingly, even if a water level of the wash water in the sump unit 110 is low, the wash water in the sump unit 100 may be smoothly pumped to the storage tank 7, so that an increased amount of water may be stored in the storage tank 7. Alternatively, the pump 82 may be located at a lower side of the washing pump 20.

A sensor 81 may be provided at the storage tank 7. The sensor 81 may be a water level sensor to detect the water level of the storage tank 7. If detected by the sensor 81 that the storage tank 7 reaches a predetermined water level, the sensor 91 may transmit information regarding the detection to a controller (not shown), and the controller (not shown) may allow the valve 80 to be closed. In this manner, the wash water of the storage tank 7 may be stored to reach a predetermined water level in the storage tank 7 while preventing the wash water that may be introduced to the storage tank 7 from overflowing in the storage tank 7. The predetermined water level may be a water level by which the storage tank 7 accommodates wash water at the most, and may be set in the controller (not shown) beforehand such that an appropriate amount of wash water may be stored in the storage tank 7.

The sensor 81 may be provided at the water supply pipe 8. The sensor 81 provided on the water supply pipe 8 may be a backflow detecting sensor. After the wash water is supplied to reach the predetermined water level in the storage tank 7, if the wash water is continuously introduced from the sump unit 100 through the water supply pipe 81, the wash water may be overflowed from the storage tank 7 to the sump unit 100. The sensor 81 may detect the wash water overflowing from the storage tank 7, and may transmit information regarding the detection to the controller (not shown). The controller (not shown) may allow the valve 80 to be closed. Accordingly, the wash water in the storage tank 7 may be prevented from exceeding the predetermined water level.

One or more embodiments of a method of controlling the amount of wash water to be stored in the storage tank 7 may include a method using the sensor 81 as the above, and a method in which an opening time of the valve 80 is set beforehand in the controller (not shown) and controlled. The opening time of the valve 80 may be set beforehand in the controller (not shown), and if the rinsing process of the dishwasher stops, the controller (not shown) may open the valve 80 during the opening time, which may be stored beforehand, such that the wash water of the sump unit 100 may be introduced to the storage tank 7. The opening time of the valve 80 stored in the controller (not shown) beforehand may be set to adapt to environments of the dishwasher provided with the storage tank 7 or the sump unit 100.

One side of the storage tank 7 may be connected to an air brake (not shown). The air brake (not shown) may have one side communicating with the washing tub 2 of the body 1 and the other side communicating with the storage tank 7. The other side of the air brake (not shown) may be connected to an upper portion of the storage tank 7, and if the water level of the wash water in the storage tank 7 exceeds a predetermined water level, the wash water in the storage tank 7 may be discharged to the inside of the washing tub 2 through the air brake (not shown). The wash water that may be discharged to the inside of the washing tub 2 may be introduced to the sump unit 100 through the inlet port 44. In this manner, even if the wash water of the sump unit 100 is continuously introduced to the storage tank 7 due to the malfunction of the sensor 81 or the valve 80, the water level of the wash water in the storage tank 7 may be kept in the predetermined water level.

After the wash water is supplied to reach the predetermined water level in the storage tank 7, the drain pump 50 may operate to drain the wash water remaining in the sump unit 100.

The pump 82 may be provided between the sump unit 100 and the storage tank 7. When a new washing process or rinsing process is performed, if the pump 82 is located at a position higher than that of the washing pump 20, the wash water stored in the storage tank 7 may be pumped and moved to the sump unit 100 by the pump 82, and if the pump 82 is located at a position lower than that of the washing pump 20, the wash water stored in the storage tank 7 may be pumped to the sump unit 100 by the washing pump 20. At the time of performing the new washing process or rinsing process, the wash water moved to the sump unit 100 may be sprayed to the inside of the washing tub 2 and used to wash or rinse dishware. In this case, the wash water accommodated in the storage tank 7 may be moved to the sump unit 100 by the washing pump 20 that may be provided at the sump unit 100. If all of the wash water accommodated in the storage tank 7 is moved to the sump unit 100 by the washing pump 20, the controller (not shown) may close the valve 80. Accordingly, the water accommodated during the new washing or rinsing process may be prevented from being moved to the storage tank 7. For example, it may be determined whether or not all of the wash water stored in the storage tank 7 is moved to the sump unit 100, by a water level detecting sensor (not shown) that may be provided at the bottom surface of the storage tank 7.

Figure 4:
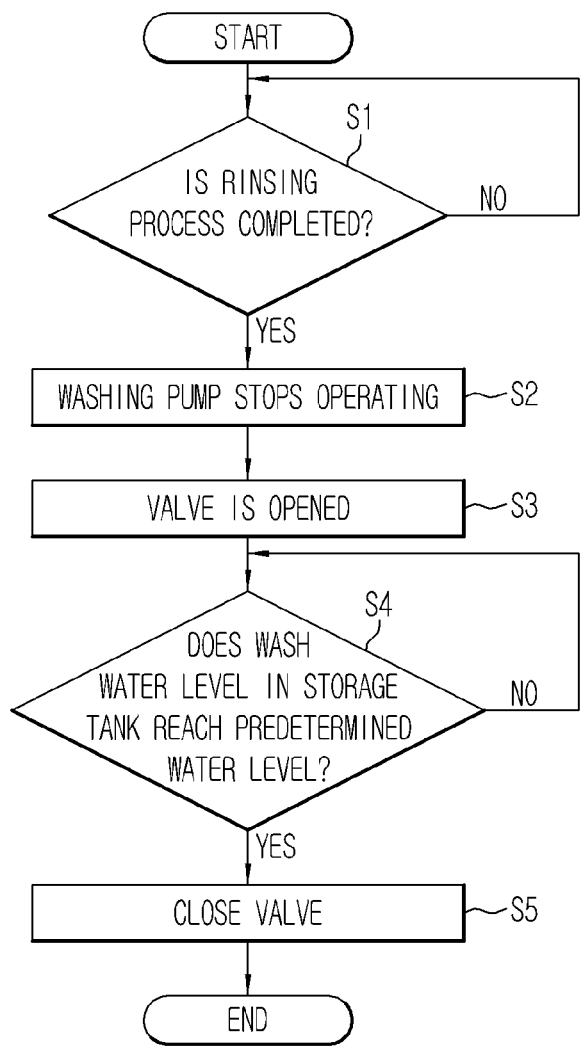
FIG. 4 is a flowchart showing a method of controlling a dishwasher in accordance with one or more embodiments.

FIG. 4 is a flowchart showing a method of controlling a dishwasher in accordance with one or more embodiments.

Referring to FIG. 4, according to a method of controlling a dishwasher in accordance with one or more embodiments, it may be determined whether a rinsing process of a dishwasher is completed, to store wash water that is to be reused (S1). If it is determined that the rinsing process is completed, the washing pump 20 may stop operating (S2). If the washing pump 20 stops operating, the valve 80 may be opened (S3). If the valve 80 is open, it may be determined whether the water level of the wash water in the storage tank 7 reaches a predetermined water level (S4). For example, whether or not the water level of the wash water in the storage tank 7 reaches a predetermined water level may be determined depending on whether wash water is detected by the sensor 81 installed on the storage tank 7. If it is determined that the water level of the wash water in the storage tank 7 reaches the predetermined water level, the controller (not shown) may close the valve 80 (S5). In this manner, the wash water to be reused may be accommodated in the storage tank 7.

Figure 5:
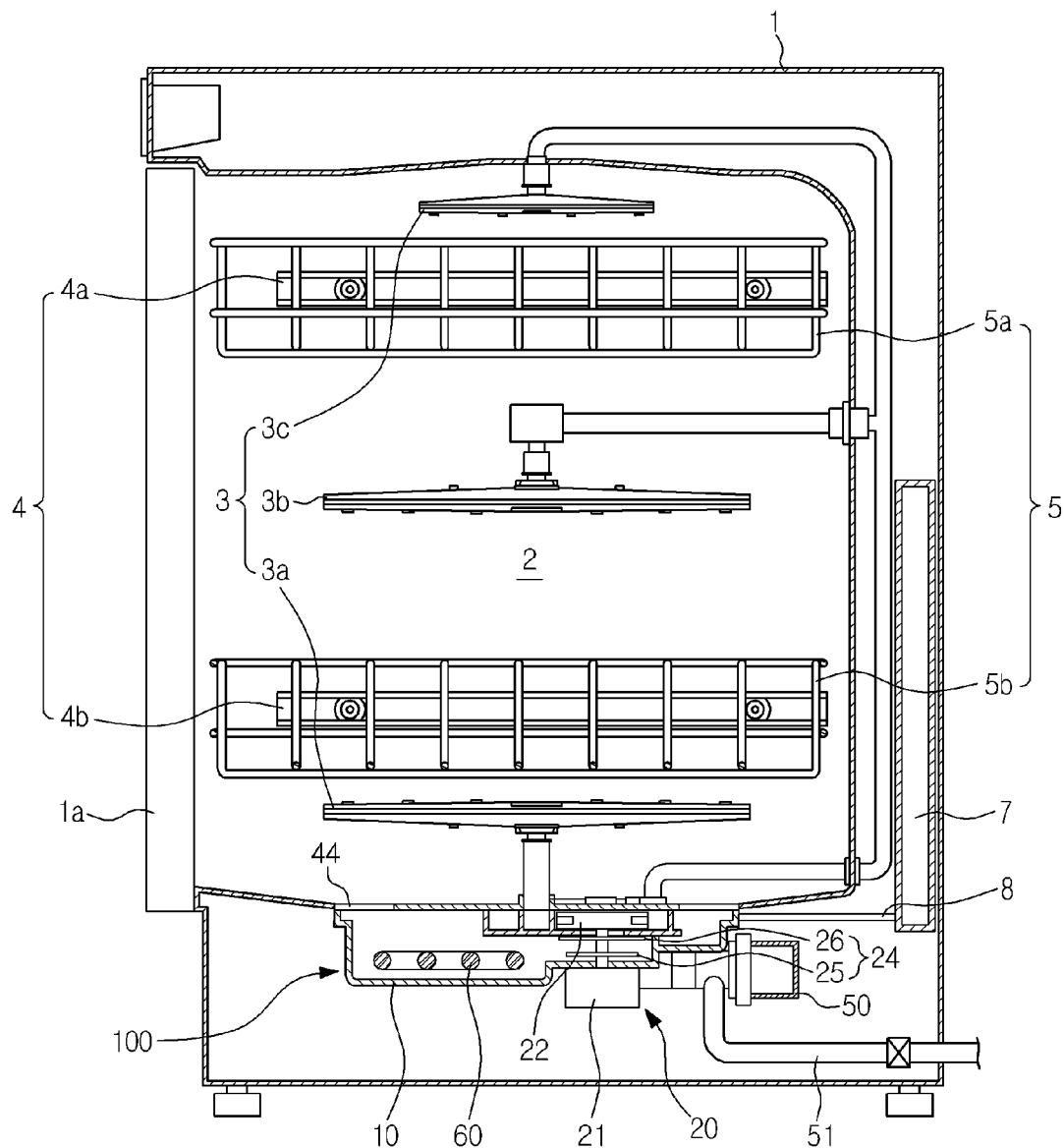
FIG. 5 is a side cross sectional view illustrating a dishwasher in accordance with one or more embodiments.
Figure 6:
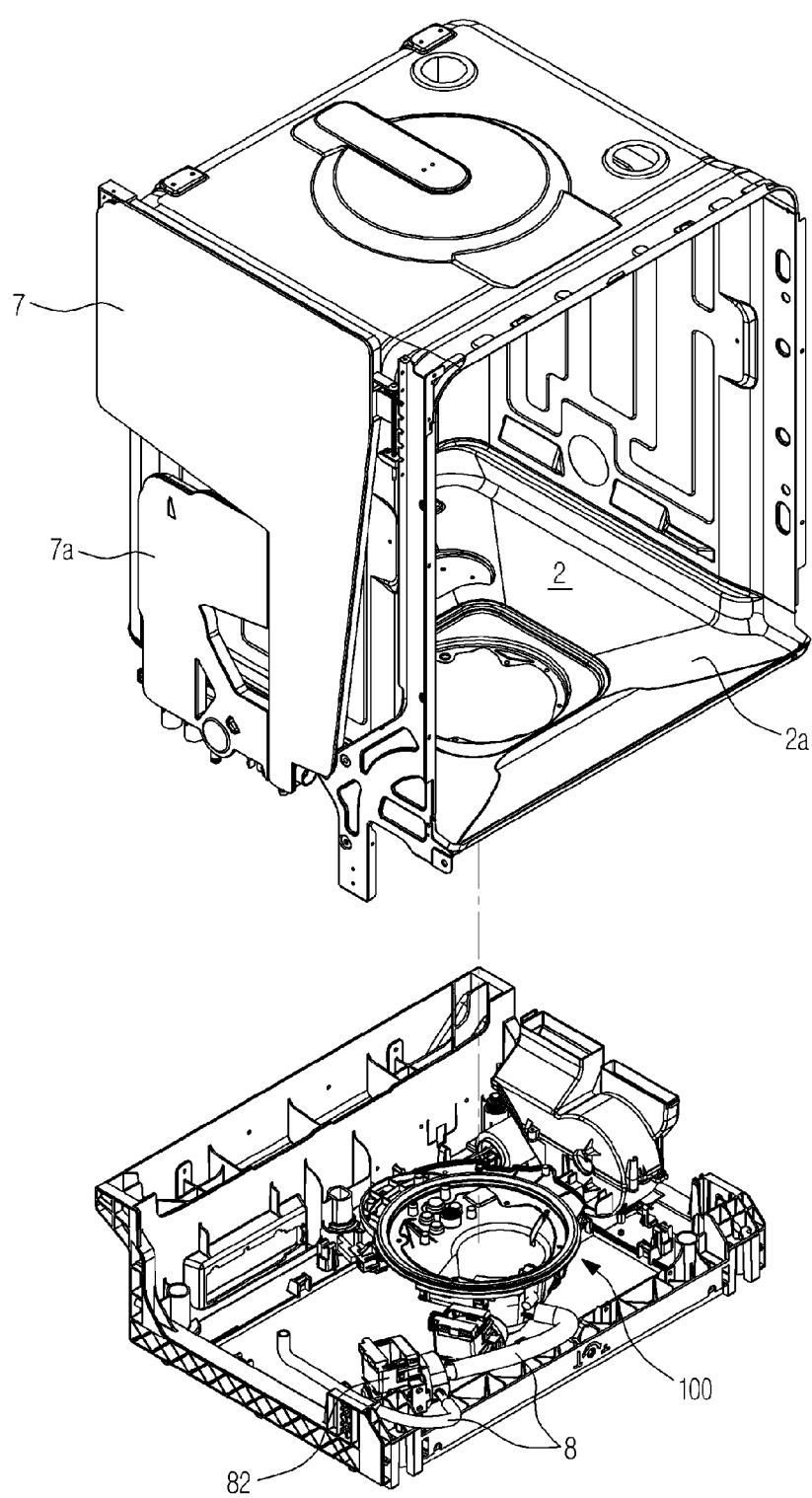
FIG. 6 is a dissembled view of a body of a dishwasher in accordance with one or more embodiments.
Figure 7:
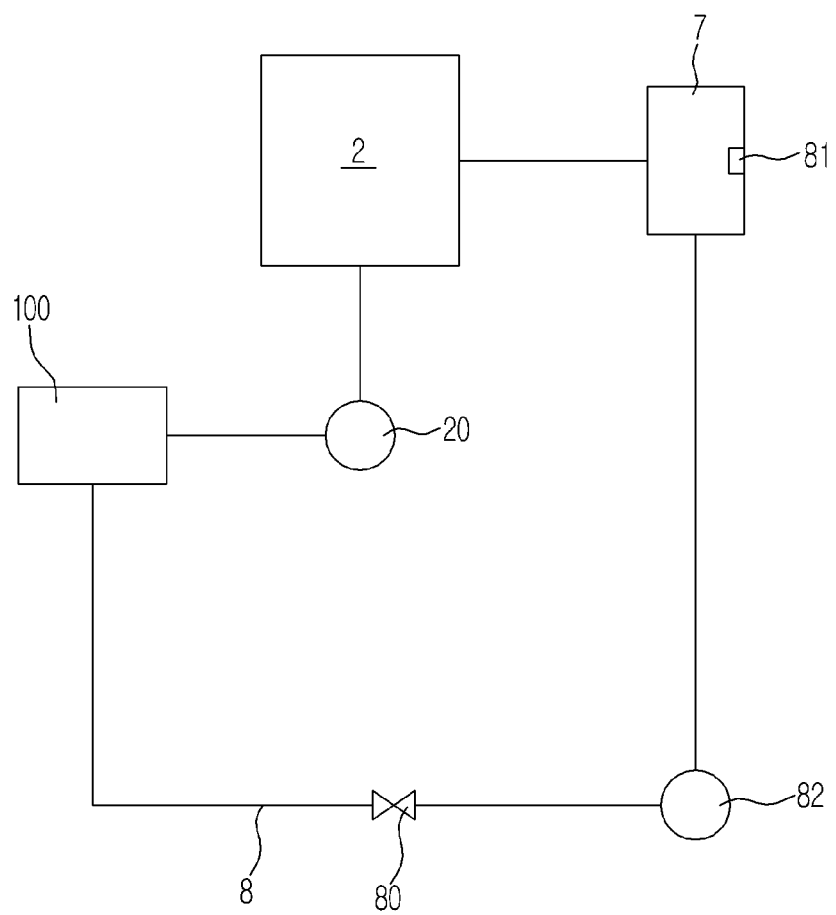
FIG. 7 is a drawing illustrating the configuration of a dishwasher in accordance with one or more embodiments.

FIG. 5 is a side cross sectional view illustrating a dishwasher in accordance with one or more embodiments. FIG. 6 is a dissembled view of a body of a dishwasher in accordance with one or more embodiments. FIG. 7 is a drawing illustrating the configuration of a dishwasher in accordance with one or more embodiments.

Referring to FIGS. 5 to 7, a storage tank 7 storing wash water to be reused may be provided at a later side of a body 1 of a dishwasher in accordance with one or more embodiments. The storage tank 7 may be connected to a sump unit 100 provided at a lower portion of the body 1 through a water supply pipe 8. The storage tank 7 may be formed, for example, of metal or plastic, etc.

In detail, the sump unit 100 may be connected to the storage tank 7 through a water supply pipe 8. The wash water that may be accommodated in the sump unit 100 may be introduced to the storage tank 7 through the water supply pipe 8. A pump 82 may be provided on the water supply pipe 8. The wash water that may be accommodated in the sump unit 100 may be pumped by the pump 82 to be supplied to the storage tank 7 that may be provided at the lateral side of the body 1. Since the pump 82 configured to pump wash water from the sump unit 100 to the storage tank 7 may be additionally provided, the pumping effect of the wash water may be improved. That is, the wash water of the sump unit 100 may receive a sufficiently great pumping force from the pump 82 and then may be introduced to the storage tank 7. Accordingly, an increased amount of wash water may be stored in the storage tank 7, and the wash water in the storage tank 7 may be maintained at a higher water level.

A sensor 81 may be provided at the storage tank 7. If wash water in the storage tank 7 is detected by the sensor 81, the sensor 81 may transmit information regarding the detection to a controller (not shown), and the controller (not shown) determines that the water level of wash water in the storage tank 7 has reached a predetermined water level and may allow the pump 82 to stop operating. In this manner, the wash water of the storage tank 7 may be supplied to reach a predetermined water level in the storage tank 7. If the pump 82 stops operating, a drain pump 50 may operate to drain the wash water remaining in the sump unit 100.

The amount of wash water supplied from the sump unit 100 to the storage tank 7 may be controlled based on a pumping time of the pump 82 that may be stored beforehand in a controller (not shown) of the pump 82. An operating time of the pump 82 may be set in the controller (not shown) beforehand, and the pump 82 may stop after performing a pumping operation during the preset operating time. In this manner, wash water in the storage tank 7 may be accommodated while maintaining a predetermined water level. If the pump 82 stops operating, the drain pump 50 may operate and the wash water remaining in the sump nit 100 may be drained.

An air brake 7a may be connected to one side of the storage tank 7. The air brake 7a may have one side communicating with a washing tub 2 of the body 1 and the other side communicating with the storage tank 7. The other side of the air brake 7a may be connected to an upper portion of the storage tank 7, and if the water level of the wash water in the storage tank 7 exceeds a predetermined water level, the wash water in the storage tank 7 may be discharged to the inside of the washing tub 2 through the air brake 7a. The wash water being discharged to the inside of the washing tub 2 may be introduced to the sump unit 100 through an inlet port 44. In this manner, even if the wash water of the sump unit 100 is continuously introduced to the storage tank 7 due to the malfunction of the sensor 81 or the valve 80, the water level of the wash water in the storage tank 7 may be kept in the predetermined water level.

When the wash water stored in the storage tank 7 needs to be reused, the wash water accommodated in the storage tank 7 may fall freely without being pumped, and may be supplied to the sump unit 100. A valve 80 may be provided at the water supply pipe 8 to open and close the water supply pipe 8. When the wash water stored in the storage tank 7 needs to be reused, the controller (not shown) may open the valve 80. As the valve 80 opens, the wash water that may be accommodated in the storage tank 7 may be supplied to the sump unit 100. The valve 80 may be, for example, an actuator or a solenoid valve, etc.

Figure 8:
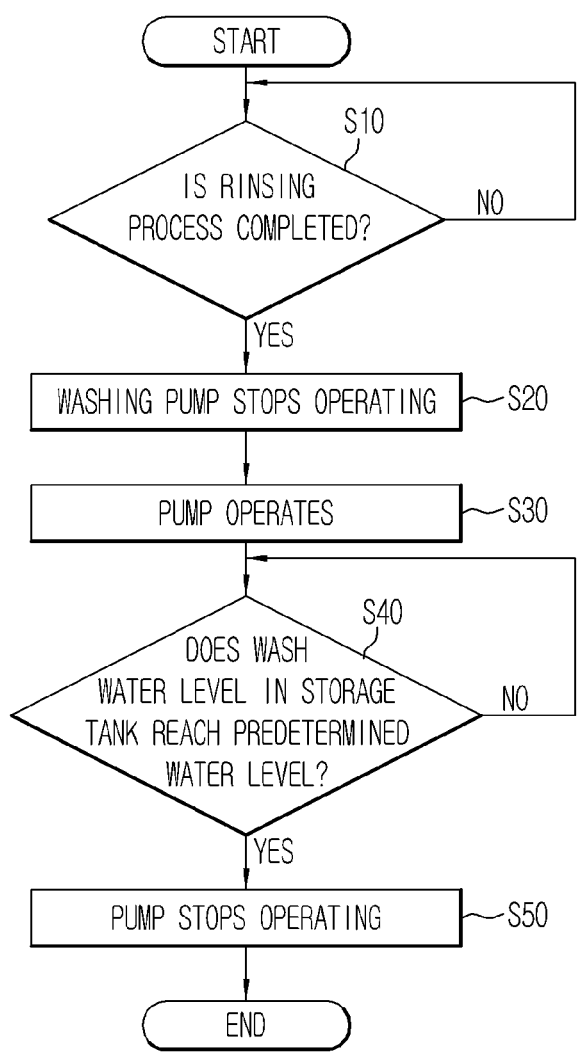
FIG. 8 is a flowchart showing a method of controlling a dishwasher in accordance with one or more embodiments.

FIG. 8 is a flowchart showing a method of controlling a dishwasher in accordance with one or more embodiments.

Referring to FIG. 8, according to a method of controlling a dishwasher in accordance with one or more embodiments, it may be determined whether a rinsing process of a dishwasher is completed (S10). If it is determined that the rinsing process is completed, the controller (not shown) may stop operating the washing pump 20 (S20). If the washing pump 20 stops operating, the controller (not shown) may operate the pump 82 (S30). If the pump 82 operates, the wash water that may be in the sump unit 100 may be pumped and then may be moved to the storage tank 7. If the pump 82 operates and the wash water is introduced to the storage tank 7, it may be determined whether the water level of the wash water in the storage tank 7 reaches a predetermined water level (S40). If it is determined that the water level of the wash water in the storage tank 7 reaches the predetermined water level, the controller (not shown) may stop operating the pump 82 (S50). In this manner, the wash water to be reused may be accommodated in the storage tank 7.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A dishwasher comprising:
   a body including a washing tub;
   a sump unit provided at a lower side of the body to accommodate wash water, and comprising a first pump configured to pump the accommodated wash water;
   a storage tank provided at the lower side of the body and configured to accommodate the wash water after being used, which is supplied from the sump unit;
   a water supply pipe connecting the sump unit to the storage tank;
   a second pump connected to the water supply pipe and configured to pump the wash water accommodated in the storage tank to the sump unit such that the wash water is reused; and
   an air brake having a first hole communicating with the washing tub of the body and a second hole communicating with an upper portion of the storage tank, wherein the first hole is positioned at a lower portion of the air brake and the second hole is positioned at an upper portion of the air brake.

2. The dishwasher of claim 1, wherein a height of a bottom surface of the storage tank is set to be lower than a height of a bottom surface of the sump unit.

3. The dishwasher of claim 1, wherein the water supply pipe is further provided with a valve that opens and closes to control supplying of the wash water through the water supply pipe.

4. The dishwasher of claim 3,
   wherein the storage tank is provided with a sensor to sense a water level of the wash water in the storage tank, and
   wherein in response to the water level of the wash water of the storage tank being sensed by the sensor, a controller closes the valve.

5. The dishwasher of claim 4, wherein a drain pipe is connected to the sump unit, and when the valve is closed, the wash water remaining in the sump unit is drained through the drain pipe.

6. A method of controlling a dishwasher having a storage tank, which is provided at a lower side of a body of the dishwasher to receive used wash water from a sump unit and to accommodate the received used wash water, a pump configured to pump the wash water accommodated in the storage tank to the sump unit, and an air brake having a first hole communicating with a washing tub of the body and positioned at a lower portion of the air brake, and a second hole of the air brake communicating with an upper portion of the storage tank and positioned at an upper portion of the air brake, the method comprising:
   determining whether a rinsing process is completed;
   stopping an operation of a washing pump;
   supplying the used wash water accommodated in the sump unit to the storage tank by opening a valve;
   determining whether a water level of the used wash water in the storage tank reaches a predetermined water level; and
   closing the valve.

7. A dishwasher comprising:
   a body provided with a washing tub in which dishware is disposed to be washed;
   a sump unit provided at a lower side of the body, and configured to accommodate wash water and pump the accommodated wash water;
   a spray nozzle configured to receive the wash water from the sump unit and spray the wash water to the washing tub;

a storage tank provided at a lateral side of the body and configured to accommodate the wash water after being used, which is supplied from the sump unit;

a water supply pipe connecting the sump unit to the storage tank;

a pump connected to the water supply pipe and configured to pump the wash water being accommodated in the sump unit to the storage tank; and an air brake having a first hole communicating with the washing tub and a second hole communicating with an upper portion of the storage tank, wherein the first hole is positioned at a lower portion of the air brake and the second hole is positioned at an upper portion of the air brake.

8. The dishwasher of claim 7, further comprising a drain pipe connected to the sump unit.

9. The dishwasher of claim 8, wherein the storage tank is provided with a sensor to sense a water level of the wash water accommodated in the storage tank, and wherein when the water level of the wash water in the storage tank is sensed by the sensor, the wash water remaining in the sump unit is drained through the drain pipe.

10. The dishwasher of claim 9, wherein the water supply pipe is provided with a valve and a controller opens the valve to allow the wash water accommodated in the storage tank to move toward the sump unit.

11. The dishwasher of claim 10, wherein in response to the wash water of the storage tank being sensed by the sensor, the controller closes the valve.

12. The dishwasher of claim 11, wherein the sump unit is further provided with a washing pump, and the wash water accommodated in the sump unit is pumped to the spray nozzle by the washing pump.

13. The dishwasher of claim 12, wherein the pump is an impeller pump.

14. The dishwasher of claim 13, wherein the pump is located at an upper side of the washing pump provided at the sump unit.

15. The dishwasher of claim 7, wherein the storage tank is formed of metal or plastic.

16. The dishwasher of claim 7, wherein the wash water in the storage tank is introduced to the washing tub through the air brake such that the storage tank is kept at a predetermined water level, and the wash water introduced to the washing tub is introduced to the sump unit.

\* \* \* \* \*